United States Patent
Ohba

(10) Patent No.: US 12,088,709 B2
(45) Date of Patent: Sep. 10, 2024

(54) INFORMATION PROCESSING APPARATUS, INFORMATION PROCESSING METHOD, AND STORAGE SYSTEM

(71) Applicant: Kioxia Corporation, Tokyo (JP)

(72) Inventor: Yoshihiro Ohba, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 235 days.

(21) Appl. No.: 17/549,651

(22) Filed: Dec. 13, 2021

(65) Prior Publication Data

US 2023/0012102 A1    Jan. 12, 2023

(30) Foreign Application Priority Data

Jul. 9, 2021    (JP) .................................. 2021-114379

(51) Int. Cl.
| | |
|---|---|
| *H04L 29/06* | (2006.01) |
| *H03M 13/15* | (2006.01) |
| *H04L 9/08* | (2006.01) |
| *H04L 67/1097* | (2022.01) |

(52) U.S. Cl.
CPC ...... *H04L 9/0869* (2013.01); *H03M 13/1515* (2013.01); *H04L 9/0825* (2013.01); *H04L 67/1097* (2013.01)

(58) Field of Classification Search
CPC . H04L 9/0869; H04L 9/0825; H04L 67/1097; H04L 9/085; H03M 13/1515; G06F 21/60; G06F 21/62; G06F 21/6218
See application file for complete search history.

(56) References Cited

U.S. PATENT DOCUMENTS

| | | | |
|---|---|---|---|
| 10,360,392 B2 | 7/2019 | Smith et al. | |
| 10,530,571 B2* | 1/2020 | Moon | H04L 9/065 |
| 10,887,099 B2 | 1/2021 | Miller et al. | |
| 2005/0053045 A1* | 3/2005 | Chmora | H04L 63/20 |
| | | | 370/338 |
| 2018/0123780 A1 | 5/2018 | Ikarashi | |

FOREIGN PATENT DOCUMENTS

JP    2007-073004 A    3/2007

OTHER PUBLICATIONS

Nippon Telegraph and Telephone Corporation, "The World's First High-speed Secret Sharing Engine for OpenStack Swift~Developing durable/volumetric effective storage system, reducing risk of information leakage with highest speed~", NTT Press Releases, May 18, 2015, 2 pages.

* cited by examiner

*Primary Examiner* — Malcolm Cribbs
(74) *Attorney, Agent, or Firm* — Maier & Maier, PLLC

(57) ABSTRACT

An information processing apparatus or method that can share secret information by plural holders. The apparatus or method execute a control to: calculate or generate an encryption key and k key symbols from k random numbers; encrypt k information symbols using the encryption key to output k encrypted symbols; output any one of the k encrypted symbols and the k key symbols as k message symbols; output a flag indicating which one of the k encrypted symbols and the k key symbols are the k message symbols; encode the k message symbols with a maximum distance separable code to output n code symbols; and output n code blocks from the n code symbols and the flag, wherein k is a positive integer of one or more, and n is a positive integer larger than k.

20 Claims, 8 Drawing Sheets

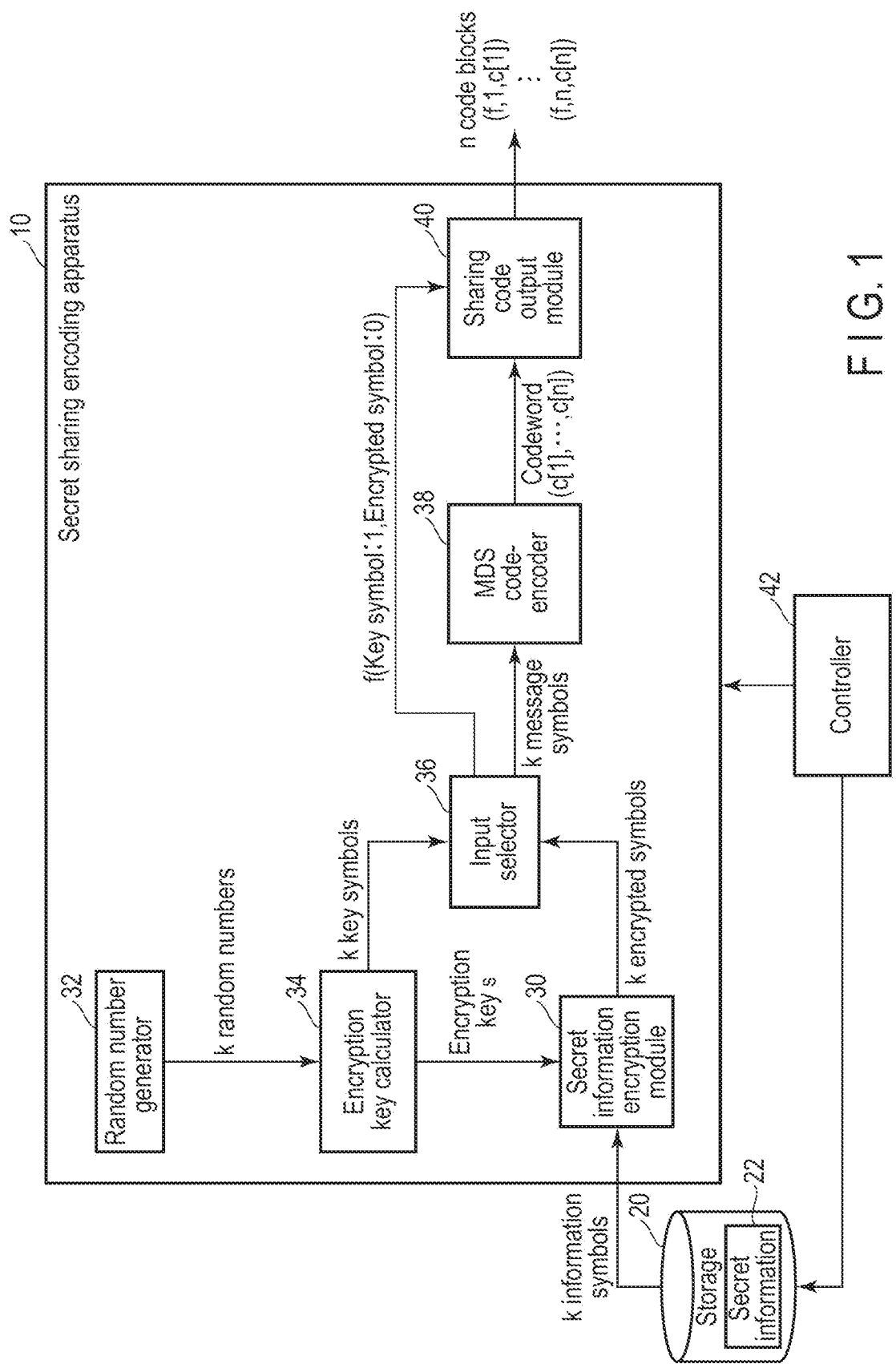
F I G. 1

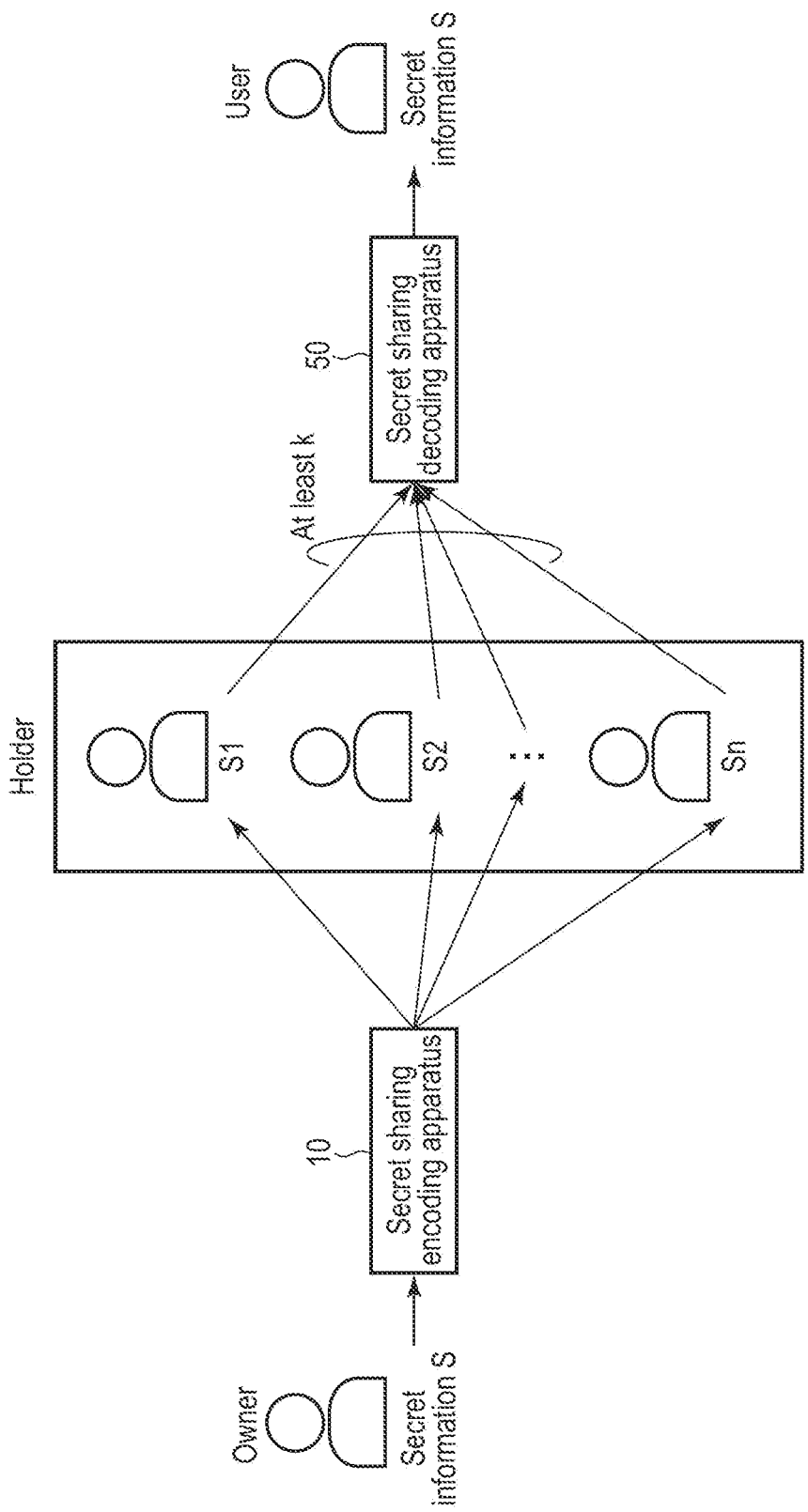
F I G. 6

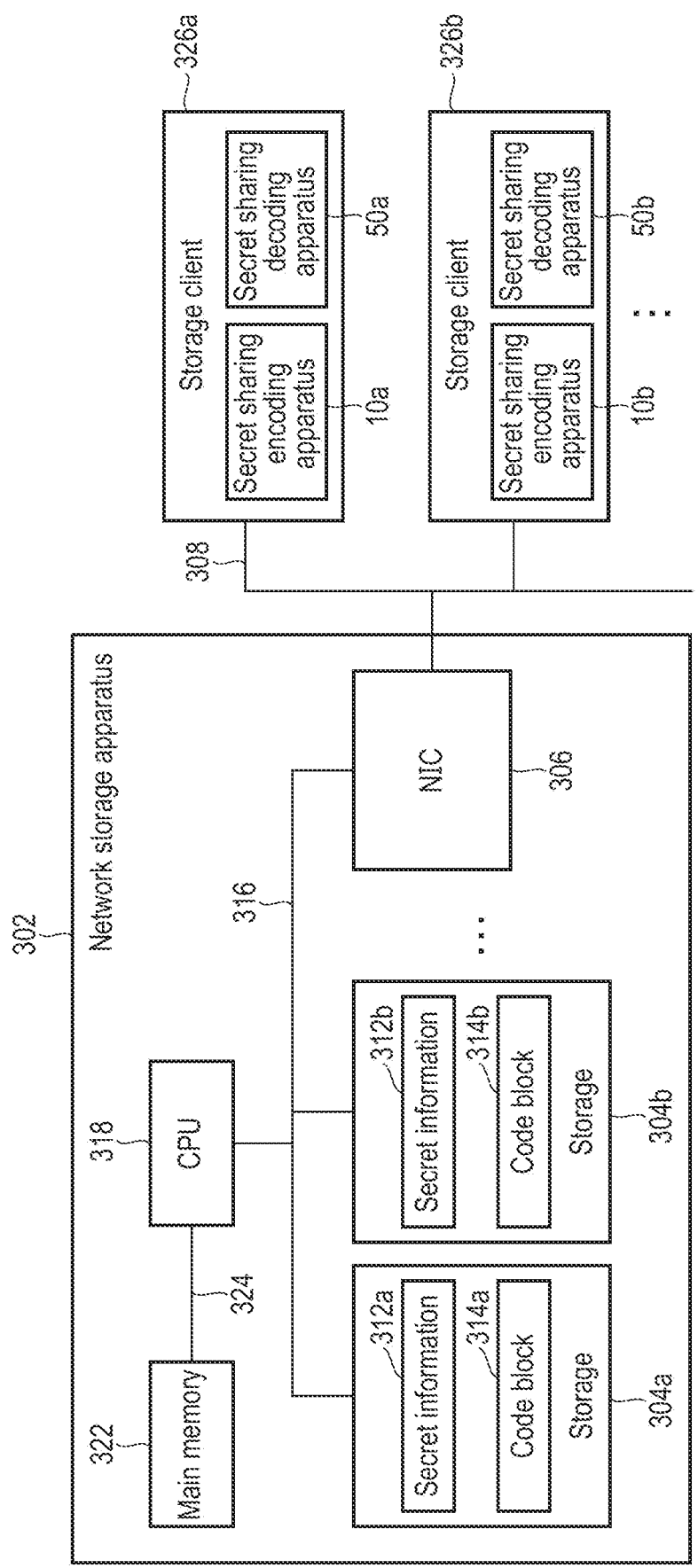
F I G. 8

INFORMATION PROCESSING APPARATUS, INFORMATION PROCESSING METHOD, AND STORAGE SYSTEM

CROSS-REFERENCE TO RELATED APPLICATIONS

This application is based upon and claims the benefit of priority from Japanese Patent Application No. 2021-114379, filed Jul. 9, 2021, the entire contents of which are incorporated herein by reference.

FIELD

Embodiments described herein relate generally to an information processing apparatus that achieves secret sharing.

BACKGROUND

Examples of a secrecy method include a secret sharing scheme. In the secret sharing scheme, secret information is held in a shared manner by a plurality of holders. The owner of the secret information distributes a plurality of different blocks obtained by encoding the secret information to different holders. The block is referred to as a share. Each share does not include secret information as plaintext. A person who intends to reconstruct the secret information is referred to as a user. The user can reconstruct the secret information when receiving a certain number or more of shares from the whole set of shares. That is, even if some of the shares are erased from the set of shares, the secret information can be reconstructed from the remaining shares. On the other hand, the user cannot reconstruct the secret information when receiving less than the certain number of shares. The secret sharing scheme is a secrecy method capable of achieving both redundancy and confidentiality.

Examples of the secret sharing scheme include Shamir's threshold scheme, the Krawzcyk scheme, and super high-speed secret sharing (SHSS) scheme.

In Shamir's threshold scheme, a certain number of simultaneous equations are made from the shares of the holder using polynomials of a plurality of dimensions. The simultaneous equations are solved by the Lagrange interpolation method, thereby obtaining secret information. Although Shamir's threshold scheme has information theoretical safety and is a robust scheme in security, there is a disadvantage that the amount of calculation required for decoding is large regardless of the presence or absence of erasure of the shares.

The Krawzcyk scheme and the SHSS scheme are hybrid-type secret sharing schemes having safety in computational complexity. The hybrid-type secret sharing scheme is configured by two types of secret sharing: secret sharing of secret information encrypted with a common key and secret sharing of the common key. In the Krawzcyk scheme, a maximum distance separable code (hereinafter referred to as MDS code) is used for the secret sharing of secret information encrypted with a common key, and Shamir's threshold scheme is used for the secret sharing of the common key. In the SHSS scheme, Reed-Solomon code (hereinafter referred to as RS code) is used for secret sharing of secret information encrypted with a common key, and an erasure correction code obtained by modifying the RS code is used for secret sharing of the common key. Thus, in the Krawzcyk scheme and the SHSS scheme, the computational complexity of decoding is significantly smaller than that of Shamir's threshold scheme when there is no erasure of the shares, but different encoding methods are required for secret sharing of the encryption key and secret sharing of the encrypted secret information, which complicates the configuration.

BRIEF DESCRIPTION OF THE DRAWINGS

FIG. 1 is a block diagram showing a configuration example of a secret sharing encoding apparatus as an example of an information processing apparatus according to the first embodiment.

FIG. 6 shows an example of a use case to which the secret sharing according to the present embodiment is applied.

FIG. 8 is a diagram showing another example of a hardware configuration of a network storage apparatus to which the secret sharing encoding apparatus and the secret sharing decoding apparatus as information processing apparatuses according to the present embodiment are applied.

DETAILED DESCRIPTION

Figure 2:
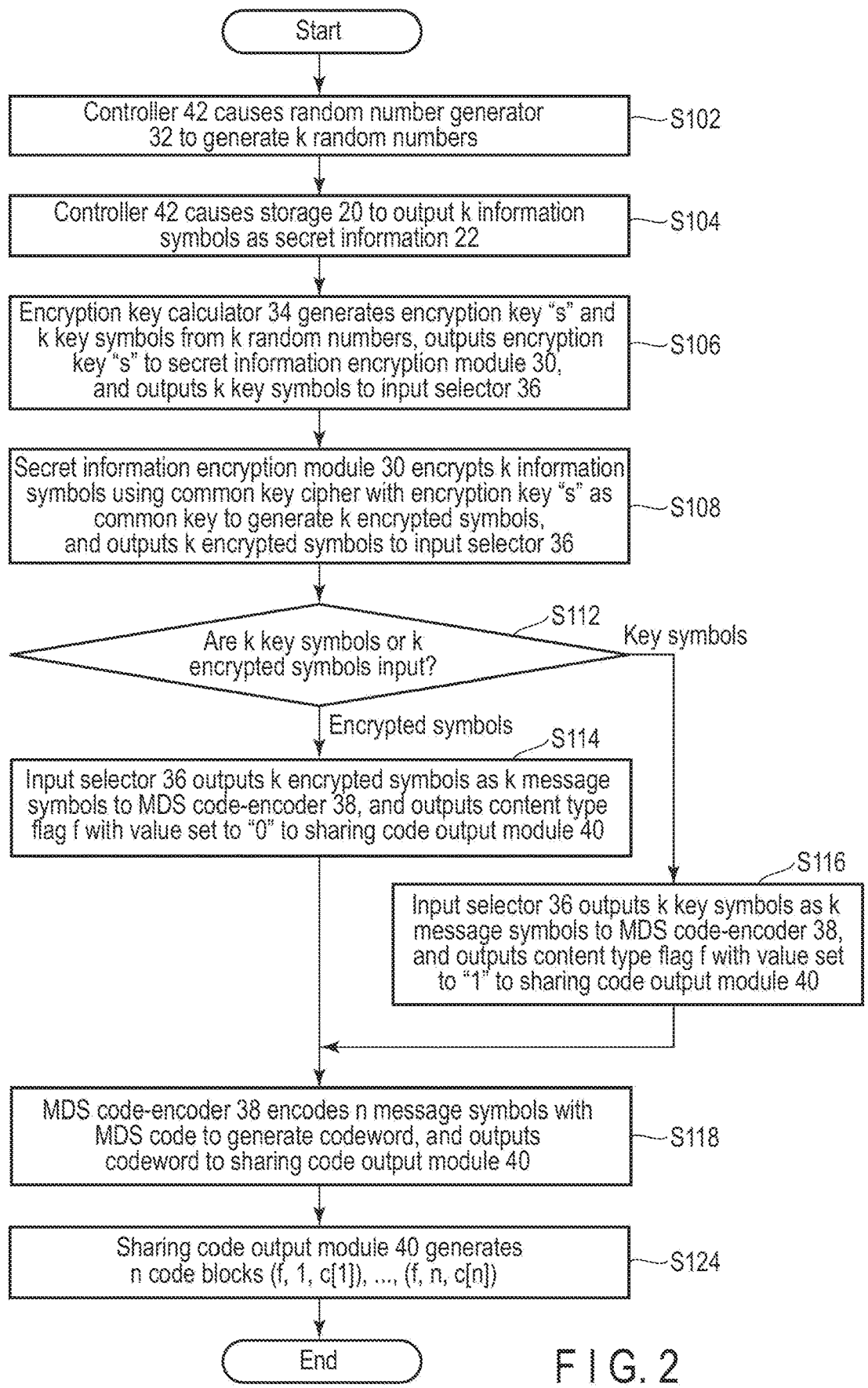
FIG. 2 is a flowchart showing an example of the secret sharing encoding according to the first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an information processing apparatus comprises a key calculator configured to calculate an encryption key and k key symbols from k random numbers; an encryption module configured to encrypt k information symbols using the encryption key to output k encrypted symbols; a selector configured to output any one of the k encrypted symbols and the k key symbols as k message symbols, and to output a flag indicating which one of the k encrypted symbols and the k key symbols are the k message symbols; an encoder configured to encode the k message symbols with a maximum distance separable code to output n code symbols; and an output module configured to output n code blocks from the n code symbols and the flag, wherein k is a positive integer of one or more, and n is a positive integer larger than k.

In general, according to another embodiment, an information processing apparatus comprises an input module configured to receive at least k code blocks each including an indexed partial codeword obtained by encoding a key symbol or an encrypted symbol and a flag indicating whether the indexed partial codeword is obtained by encoding a key symbol or an encrypted symbol, and to output the indexed partial codeword and the flag; a symbol decoder configured to decode k message symbols from the indexed partial codeword with a maximum distance separable code; a selector configured to output the k message symbols as k key symbols or as k encrypted symbols depending on a value of the flag; an encryption key calculator configured to calculate an encryption key from the k key symbols output from the selector; and a secret information decryption module configured to decrypt k information symbols from the k encrypted symbols output from the selector with the encryption key, wherein k is a positive integer of one or more.

First Embodiment

FIG. 1 is a block diagram showing a configuration example of a secret sharing encoding apparatus 10 as an example of an information processing apparatus according to the first embodiment.

The secret sharing encoding apparatus 10 is connected to the storage 20 that stores secret information 22. An example of the storage 20 is a solid state drive (SSD) including a nonvolatile memory. The storage 20 stores a large number of information symbols, and stores k information symbols among the large number of information symbols as the secret information 22. The storage 20 stores a large number of pieces of secret information 22.

The secret sharing encoding apparatus 10 implements secret sharing by sharing and passing a large number of secret information 22 to a plurality of different holders (also referred to as entities).

The secret sharing encoding apparatus 10 includes a secret information encryption module 30, a random number generator 32, an encryption key calculator 34, an input selector 36, an MDS code-encoder 38, and a sharing code output module 40.

The k information symbols as the secret information 22 output from the storage 20 are input to the secret information encryption module 30. k is a positive integer of 1 or more. The k information symbols are a unit of the secret sharing encoding.

The k random numbers output from the random number generator 32 are input to the encryption key calculator 34. The encryption key calculator 34 calculates a linear sum of the k random numbers and outputs one encryption key "s" and k key symbols. The encryption key "s" is input to the secret information encryption module 30, and the k key symbols are input to the input selector 36. The k encrypted symbols output from the secret information encryption module 30 are also input to the input selector 36.

The input selector 36 outputs k message symbols and a content type flag f. The k message symbols are input to the MDS code-encoder 38. The content type flag f is input to the sharing code output module 40. The MDS code-encoder 38 encodes the k message symbols with an MDS code to generate a codeword. The codeword is a sequence of n code symbols c[1], ..., c[n] obtained by encoding the k message symbols with the MDS code. n is a positive integer of k or more. The codeword is input to the sharing code output module 40. A method for generating n code symbols from the k message symbols will be described below.

The MDS code is characterized by three parameters of a code length n (symbol), the number of information symbols k (symbol), and a minimum Hamming distance d. When the MDS code is used for the erasure correction, it has the erasure correction capability of (n−k) (=d−1) symbols under the assumption that the received symbol does not include an error. The MDS code-encoder 38 may use an RS code as the MDS code.

The sharing code output module 40 outputs n code blocks (f, 1, c[1]), ..., (f, n, c(n)) including a set of a content type flag f, an intra-codeword index i, and code symbols c[1], ..., c[n]. The intra-codeword index i is an index of the code symbol c[i] in the codeword, and is a positive integer of 1 to n. The n code blocks are held by n holders, respectively.

The secret information encryption module 30, the random number generator 32, the encryption key calculator 34, the input selector 36, the MDS code-encoder 38, and the sharing code output module 40 may be implemented by hardware such as an electronic circuit, or may be implemented as software by a processor (not shown) executing a program.

A controller 42 is connected to the storage 20 and the secret sharing encoding apparatus 10. The controller 42 controls reading of the secret information 22 from the storage 20 and an encoding operation of the secret sharing encoding apparatus 10.

FIG. 2 is a flowchart showing an example of the secret sharing encoding according to the first embodiment.

In S102, the controller 42 causes the random number generator 32 to generate k random numbers. The k random numbers are input to the encryption key calculator 34. In the case where an encryption key is set or reset (updated), the controller 42 causes the random number generator 32 to generate k random numbers. The encryption key calculator 34 includes a memory and stores a generated encryption key. If the stored encryption key is used, the controller 42 does not need to cause the random number generator 32 to generate k random numbers.

In S104, the controller 42 causes the storage 20 to output k information symbols as secret information 22. The k information symbols are input to the secret information encryption module 30. The k information symbols are a unit of encoding.

The controller 42 may reverse the execution order of the processing in S102 and the processing in S104, or may cause the two pieces of processing to be executed simultaneously.

When k random numbers are input to the encryption key calculator 34, the encryption key calculator 34 generates one encryption key "s" and k key symbols from the k random numbers, outputs the encryption key "s" to the secret information encryption module 30, and outputs the k key symbols to the input selector 36 in S106. There are several methods for generating the encryption key "s" and the k key symbols a1, a2, ..., ak. As an example, two methods in which the encryption key calculator 34 generates one encryption key "s" and k key symbols a1, a2, ..., ak from k random numbers will be described.

In the first method, the encryption key "s" is a sum of k random numbers r1, r2, ..., rk.

$$s = \sum_{i=1}^{k} ri$$ Equation 1

The k key symbols a1, a2, ..., and ak are k random numbers r1, r2, ..., and rk, respectively.

$$ai = ri \quad \text{Equation 2}$$

where i is a positive integer of 1 to k.

In the second method, one of the k random numbers r1, r2, ..., rk $$rj (j \in [1,k])$$

is the encryption key "s".

$$s = rj \quad \text{Equation 3}$$

The key symbol aj is obtained by subtracting other random numbers from the encryption key "s".

$$aj = s - \sum_{i \in [1,k] \setminus j} ri \quad \text{Equation 4}$$

Let each $i \in [1,K] \setminus j$ satisfy $ai = ri$

In any of the first method and the second method, each of the encryption key "s" and the k key symbols a1, a2, ..., and ak is represented by a linear sum of k random numbers r1, r2, ..., and rk.

Returning to the description of the flowchart in FIG. 2, when k information symbols are input to the secret information encryption module 30, the secret information encryption module 30 encrypts the k information symbols using common key cipher with the encryption key "s" as the common key to generate k encrypted symbols, and outputs the k encrypted symbols to the input selector 36 in S108. For example, the advanced encryption standard (AES) may be used as the common key cipher.

The execution order of the processing in S106 and the processing in S108 may be reversed, or may cause the two pieces of processing to be executed simultaneously.

In S112, the input selector 36 determines whether the k key symbols or the k encrypted symbols have been input.

If the input selector 36 determines that the k encrypted symbols have been input, the input selector 36 outputs the k encrypted symbols as k message symbols to the MDS code-encoder 38, and outputs the content type flag f with a value set to "0" to the sharing code output module 40 in S114. The content type flag f indicates whether the k message symbols are key symbols or encrypted symbols. When the value is "1", the content type flag f indicates that the k message symbols are key symbols. When the value is "0", the content type flag f indicates that the k message symbols are encrypted symbols.

If the input selector 36 determines that the k key symbols have been input, the input selector 36 outputs the k key symbols as k message symbols to the MDS code-encoder 38, and outputs the content type flag f with a value set to "1" to the sharing code output module 40 in S116.

When the k message symbols are input to the MDS code-encoder 38, the MDS code-encoder 38 encodes the n message symbols with the MDS code to generate a codeword, and outputs the codeword to the sharing code output module 40 in S118.

In S124, the sharing code output module 40 generates n code blocks (f, 1, c[1]), ..., (f, n, c[n]). The n code blocks (f, 1, c[1]), ..., (f, n, c[n]) are respectively passed to the n holders, and are respectively held by the n holders. For example, the n code blocks (f, 1, c[1]), ..., (f, n, c[n]) are respectively stored in storages of the n holders.

In the secret sharing encoding apparatus 10, the encrypted symbols or the key symbols of the secret information are selected by the input selector 36, and input to the MDS code-encoder 38. The encrypted symbols and the key symbols are separately encoded. Therefore, hybrid-type secret sharing including two types of secret sharing: secret sharing of secret information and secret sharing of an encryption key is achieved. Since the encrypted symbols of the secret information and the key symbols are encoded with the same MDS code, hybrid-type secret sharing is achieved with a simple configuration. The code block output from the secret sharing encoding apparatus 10 includes a content type flag indicating whether the codeword is a code of the key symbols or a code of the encrypted symbols.

Figure 3:
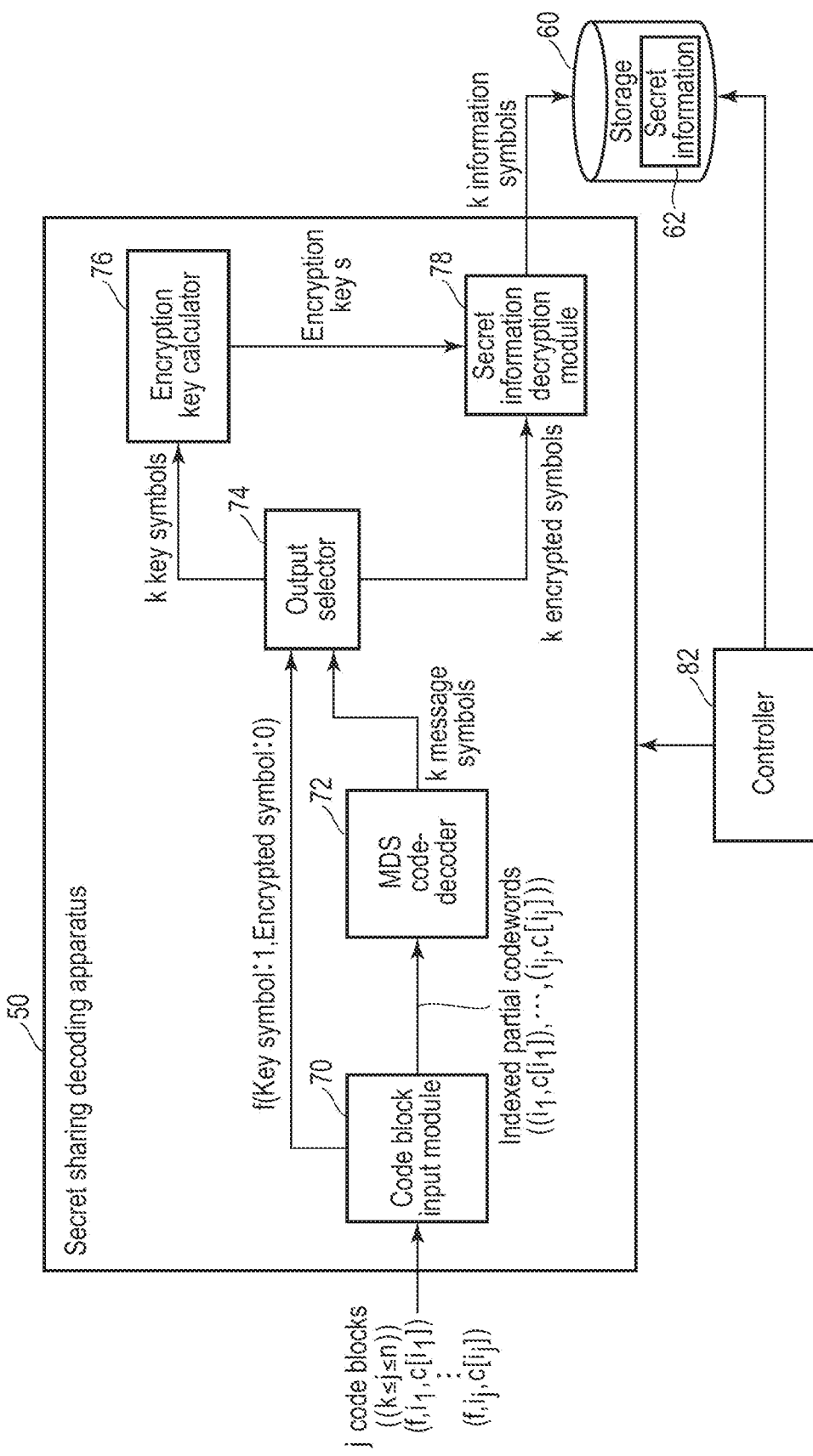
FIG. 3 is a block diagram showing a configuration example of a secret sharing decoding apparatus as an information processing apparatus according to the first embodiment.

FIG. 3 is a block diagram showing a configuration example of a secret sharing decoding apparatus 50 as an information processing apparatus according to the first embodiment. The secret sharing decoding apparatus 50 inputs j ($k \leq j \leq n$) code blocks, that is, at least k code blocks among the n code blocks held by the n respective holders, and reconstructs k information symbols.

The secret sharing decoding apparatus 50 includes a code block input module 70, an MDS code-decoder 72, an output selector 74, an encryption key calculator 76, and a secret information decryption module 78.

Code blocks are input to the code block input module 70. For example, j code blocks are read from the storages of n holders and input to the code block input module 70. The j code blocks include a set of the content type flag f, intra-codeword indexes $i_1, \ldots, i_j$, and code symbols $(c[i_1], \ldots, c[i_j])$. The code block input module 70 separates the j code blocks into the content type flag f and the indexed partial codewords $(i_1, c[i_1]), \ldots, (i_j, c[i_j])$, outputs the content type flag f to the output selector 74, and outputs the indexed partial codewords $(i_1, c[i_1]), \ldots, (i_j, c[i_j])$ to the MDS code-decoder 72. Assuming that the number of code blocks is j, the indexed partial codewords $(i_1, c[i_1]), \ldots, (i_j, c[i_j])$ are expressed by a sequence of j intra-codeword indexes and code symbols.

The MDS code-decoder 72 decodes k message symbols from at least k indexed partial codewords $(i_1, c[i_1]), (i_k, c[i_k])$ using the MDS code. The k message symbols are input to the output selector 74. The encoding apparatus 10 encodes encrypted symbols to create encoded symbols, or encodes key symbols to create encoded symbols. Whether the encoded symbols are based on the encrypted symbols or the key symbols is indicated by the value of the content type flag f. Therefore, based on the value of the content type flag f, the output selector 74 outputs the k message symbols as k key symbols to the encryption key calculator 76, or outputs the k message symbols as k encrypted symbols to the secret information decryption module 78.

The encryption key calculator 76 generates an encryption key "s" from the k key symbols.

The secret information decryption module 78 decrypts k information symbols from the k encrypted symbols using the encryption key "s". The k information symbols are stored in the storage 60 as secret information 62.

The code block input module 70, the MDS code-decoder 72, the output selector 74, the encryption key calculator 76, and the secret information decryption module 78 may be implemented by hardware such as an electronic circuit, or may be implemented as software by a processor (not shown) executing a program.

A controller 82 is connected to the storage 60 and the secret sharing decoding apparatus 50. The controller 82 controls writing of the secret information 62 to the storage 60 and a decoding operation of the secret sharing decoding apparatus 50.

Figure 4:
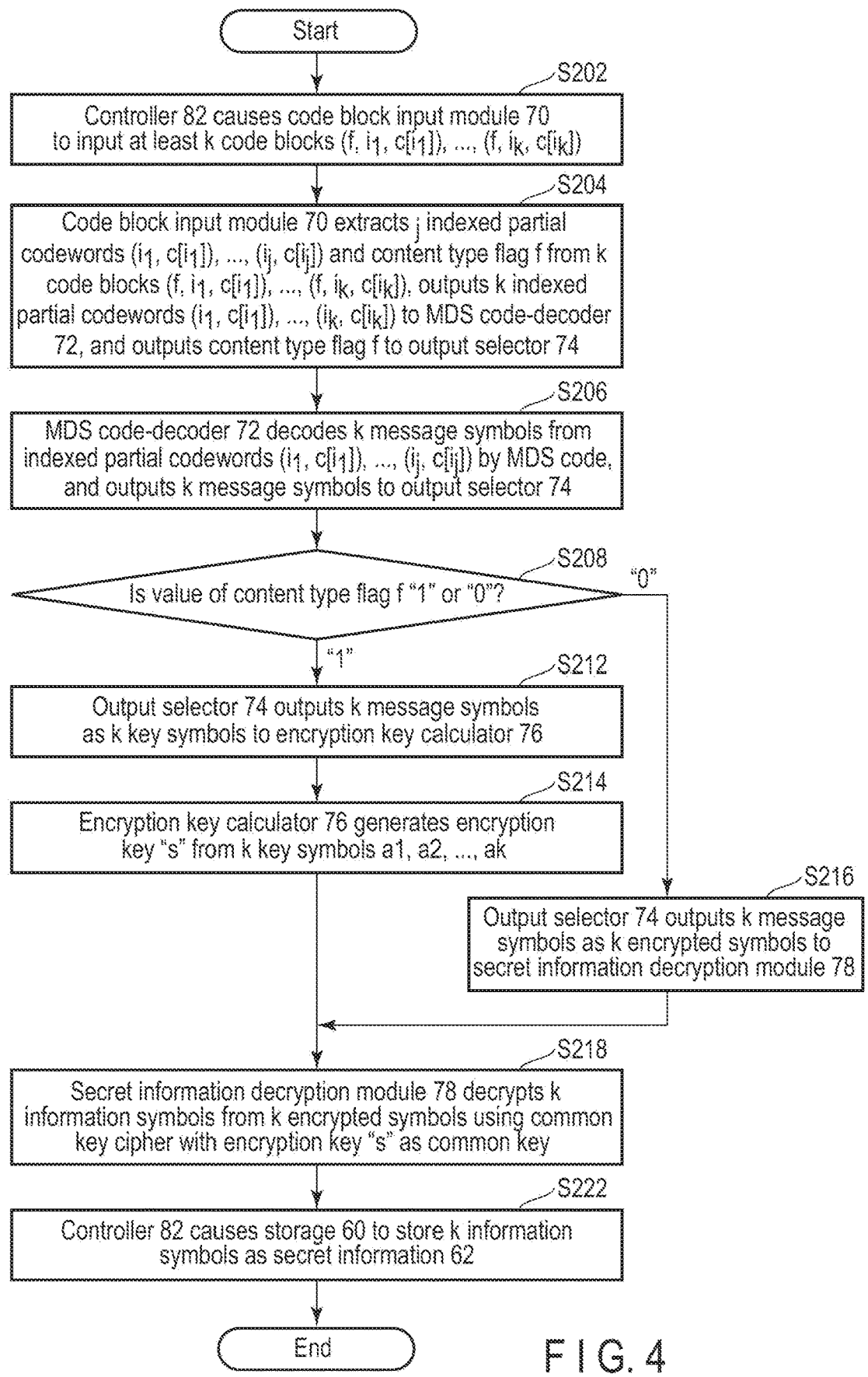
FIG. 4 is a flowchart showing an example of the secret sharing decoding processing according to the first embodiment.

FIG. 4 is a flowchart showing an example of the secret sharing decoding processing according to the first embodiment.

The controller 82 causes the code block input module 70 to input at least k code blocks $(f, i_1, c[i_1]), \ldots, (f, i_k, i_k)$ in S202.

The code block input module 70 extracts the k indexed partial codewords $(i_1, c[i_1]), \ldots, (i_k, c[i_k])$ and the content type flag f from the k code blocks $(f, i_1, c[i_1]), \ldots, (f, i_k, c[i_k])$, outputs the k indexed partial codewords $(i_1, c[i_1]), \ldots, (i_k, c[i_k])$ to the MDS code-decoder 72, and outputs the content type flag f to the output selector 74 in S204.

When j indexed partial codewords $(i_1, c[i_1]), \ldots, (i_j, c[i_j])$ are input to the MDS code-decoder 72, the MDS code-decoder 72 decodes k message symbols from the indexed partial codewords $(i_1, c[i_1]), \ldots, (i_j, c[i_j])$ by the MDS code, and outputs the k message symbols to the output selector 74 in S206. The MDS code-decoder 72 may use an RS code as the MDS code.

When the flag f and the k message symbols are input to the output selector 74, the output selector 74 determines in S208 whether the value of the content type flag f is "1" or "0".

If the output selector 74 determines that the value of the content type flag f is "1", the output selector 74 outputs k message symbols as k key symbols to the encryption key calculator 76 in S212.

When k key symbols are input to the encryption key calculator 76, the encryption key calculator 76 generates an encryption key "s" from the k key symbols a1, a2, ..., ak in S214.

$$s = \sum_{i=1}^{k} ai \qquad \text{Equation 5}$$

If the output selector 74 determines that the value of the content type flag f is "0", the output selector 74 outputs k message symbols as k encrypted symbols to the secret information decryption module 78 in S216.

When the k encrypted symbols and the encryption key "s" are input to the secret information decryption module 78, the secret information decryption module 78 decrypts the k information symbols from the k encrypted symbols using common key cipher with the encryption key "s" as a common key in S218.

In S222, the controller 82 causes the storage 60 to store k information symbols as the secret information 62.

Next, an RS code as an example of the MDS code used by the MDS code-encoder 38 and the MDS code-decoder 72 will be described. The RS code is a type of MDS code characterized by three parameters of a code length n (symbol), the number of information symbols k (symbol), and a minimum Hamming distance d. The RS code is defined on GF ($2^W$). w is a bit length of the symbol. Now, let L (L≤n−k) be the number of erasure symbols, u (k message symbols) be the message, v (n code symbols) be the codeword of u, and let v' be a partial codeword (j code symbols included in j code blocks) of a (j=n−L) dimensional vector constituted by only received code symbols out of v. When L≤n−k, the RS code has a property that a mapping from v to v' is bijective, and u can be obtained as an inverse of v' by decoding. The encoding and decoding of the RS code can be expressed by Equations 6 and 7, respectively, using a generator matrix G (k×n matrix) and a sub-generator matrix G' (k×(n−L) matrix) obtained by removing columns corresponding to L erasure symbols from G.

<Encoding>

$$v = uG \qquad \text{Equation 6}$$

<Decoding>

$$u = v'G'^{-1} \qquad \text{Equation 7}$$

It can be learned from Equation 7 that n codewords are generated from the k message symbols. It can be learned from Equation 8 that k message symbols are generated from j codewords. A condition imposed on G is that an inverse matrix exists in any submatrix G' of G. It should be noted that the submatrix G' can be uniquely generated from a set of intra-codeword indexes included in the indexed partial codewords and the generator matrix G. For example, when n=8, k=j=5, and the set of intra-codeword indexes is {1, 2, 3, 6, 7}, G' is a matrix obtained by removing the fourth, fifth, and eighth columns of G.

In the secret sharing decoding apparatus 50, the indexed partial codewords extracted from the code block are decoded to a message symbol by the MDS code. The message symbol is supplied to the encryption key calculator 76 or the secret information decryption module 78 according to the value of the content type flag f. The content type flag f indicates whether the indexed partial codewords indicate the code of the key symbol or the code of the encrypted symbol. Thus, the secret sharing decoding apparatus 50 can decode the encryption key "s" from the code block and decrypt the encrypted symbol to the information symbol with the encryption key "s".

Figure 5:
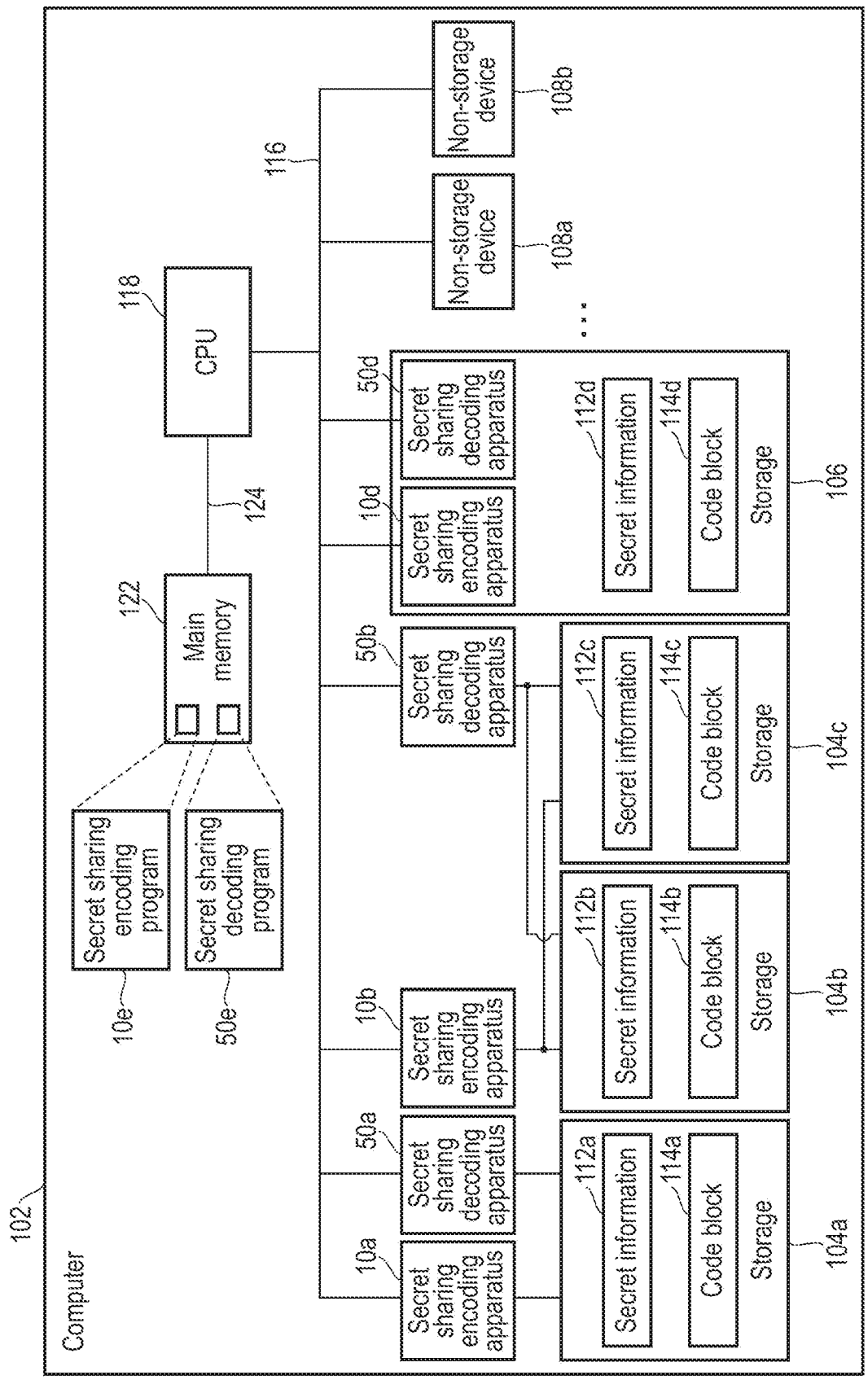
FIG. 5 is a diagram showing a hardware configuration example of a computer to which the secret sharing encoding apparatus and the secret sharing decoding apparatus as information processing apparatuses according to the present embodiment are applied.

FIG. 5 is a diagram showing a hardware configuration example of a computer to which the secret sharing encoding apparatus 10 and the secret sharing decoding apparatus 50 as information processing apparatuses according to the present embodiment are applied. The computer 102 includes storages 104a, 104b, 104c, and 106, non-storage devices 108a and 108b, a CPU 118, and a main memory 122. FIG. 5 shows an example in which secret sharing encoding apparatuses 10a, 10b, and 10d and secret sharing decoding apparatuses 50a, 50b, and 50d are attached to the computer 102 in a form of accompanying the storages 104a, 104b, 104c, and 106.

The secret sharing encoding apparatus 10a and the secret sharing decoding apparatus 50a are externally attached to the storage 104a.

The secret sharing encoding apparatus 10b is externally attached to a plurality of, here, two storages 104b and 104c. The secret sharing decoding apparatus 50b is externally attached to a plurality of, here, two storages 104b and 104c. It is assumed in FIG. 5 that functions of the secret sharing encoding apparatus 10b and the secret sharing decoding apparatus 50b are mounted in a portion such as a RAID controller, for example. Alternatively, it is assumed in FIG. 5 that functions of the secret sharing encoding apparatus 10b and the secret sharing decoding apparatus 50b are mounted together with functions of processing storage protocols of the storages 104b and 104c on a bridge chip such as a PCI Express™ switch.

The secret sharing encoding apparatus 10d and the secret sharing decoding apparatus 50d are integrated in the storage 106.

The secret sharing encoding apparatuses 10a, 10b, and 10d correspond to the secret sharing encoding apparatus 10 shown in FIG. 1. The secret sharing decoding apparatuses 50a, 50b, and 50d correspond to the secret sharing decoding apparatus 50 shown in FIG. 3.

The storage 104a stores secret information 112a and a code block 114a. The storage 104b stores secret information 112b and a code block 114b. The storage 104c stores secret information 112c and a code block 114c. The storage 106 stores secret information 112d and a code block 114d. The secret information 112a, 112b, 112c, and 112d corresponds to the secret information 22 shown in FIG. 1 or the secret information 62 shown in FIG. 3. The code blocks 114a, 114b, 114c, and 114d correspond to the code block shown in FIG. 1 or the code block shown in FIG. 3.

The secret sharing encoding apparatus 10a reads the secret information 112a from the storage 104a and encodes the secret information 112a to generate the code block 114a. The secret sharing encoding apparatus 10a writes the code block 114a to the storage 104a. The secret sharing decoding apparatus 50a reads the code block 114a from the storage 104a and decodes the code block 114a to the secret information 112a. The secret sharing decoding apparatus 50a writes the secret information 112a to the storage 104a.

The secret sharing encoding apparatus 10b reads the secret information 112b from the storage 104b and encodes the secret information 112b to generate the code block 114b. The secret sharing encoding apparatus 10b writes the code block 114b to the storage 104b. The secret sharing encoding apparatus 10b reads the secret information 112c from the storage 104c and encodes the secret information 112c to generate the code block 114c. The secret sharing encoding apparatus 10b writes the code block 114c to the storage 104c.

The secret sharing decoding apparatus 50b reads the code block 114b from the storage 104b and decodes the code block 114b to the secret information 112b. The secret sharing decoding apparatus 50b writes the secret information 112b to the storage 104b. The secret sharing decoding apparatus 50b reads the code block 114c from the storage 104c and decodes the code block 114c to the secret information 112c. The secret sharing decoding apparatus 50b writes the secret information 112c to the storage 104c.

The secret sharing encoding apparatus 10d reads the secret information 112d from the storage 106 and encodes the secret information 112d to generate the code block 114d. The secret sharing encoding apparatus 10d writes the code block 114d to the storage 106. The secret sharing decoding apparatus 50d reads the code block 114d from the storage 106 and decodes the code block 114d to the secret information 112d. The secret sharing decoding apparatus 50d writes the secret information 112d to the storage 106.

The secret sharing encoding apparatuses 10a, 10b, and 10d, the secret sharing decoding apparatuses 50a, 50b, and 50d, and the non-storage devices 108a and 108b are connected to the CPU 118 via the PCIe™ bus 116.

The main memory 122 is connected to the CPU 118 via the memory bus 124. The main memory 122 stores a secret sharing encoding program 10e and a secret sharing decoding program 50e. When the CPU 118 executes the secret sharing encoding program 10e, functional modules corresponding to the secret sharing encoding apparatus 10 shown in FIG. 1 are achieved by software. When the CPU 118 executes the secret sharing decoding program 50e, functional modules corresponding to the secret sharing decoding apparatus 50 shown in FIG. 3 are achieved by software.

FIG. 6 shows an example of a use case to which the secret sharing according to the present embodiment is applied. The secret sharing encoding apparatus 10 is disposed on the owner side of the secret information S, and the secret sharing decoding apparatus 50 is disposed on the user side of the secret information S. That is, the computer 102 in FIG. 5 can be used by any of the owner, the user, and the holder of the secret information S. If the computer 102 is used only by the owner of the secret information S, the computer 102 does not need to include the secret sharing decoding apparatuses 50a, 50b, and 50d and the secret sharing decoding program 50e. If the computer 102 is used only by the user of the secret information S, the computer 102 does not need to include the secret sharing encoding apparatuses 10a, 10b, and 10d and the secret sharing encoding program 10e. If the computer 102 is used only by the holder, the computer 102 does not need to include the secret sharing encoding apparatuses 10a, 10b, and 10d, the secret sharing encoding program 10e, the secret sharing decoding apparatuses 50a, 50b, and 50d, and the secret sharing decoding program 50e.

The secret sharing encoding apparatus 10 encodes the secret information S owned by the owner and outputs n code blocks. Each of the n holders holds one of the n code blocks as a share S1, S2, . . . , Sn. The secret sharing decoding apparatus 50 obtains the secret information S by decoding when at least k shares of the n shares S1, S2, . . . , Sn are input.

Second Embodiment

Figure 7:
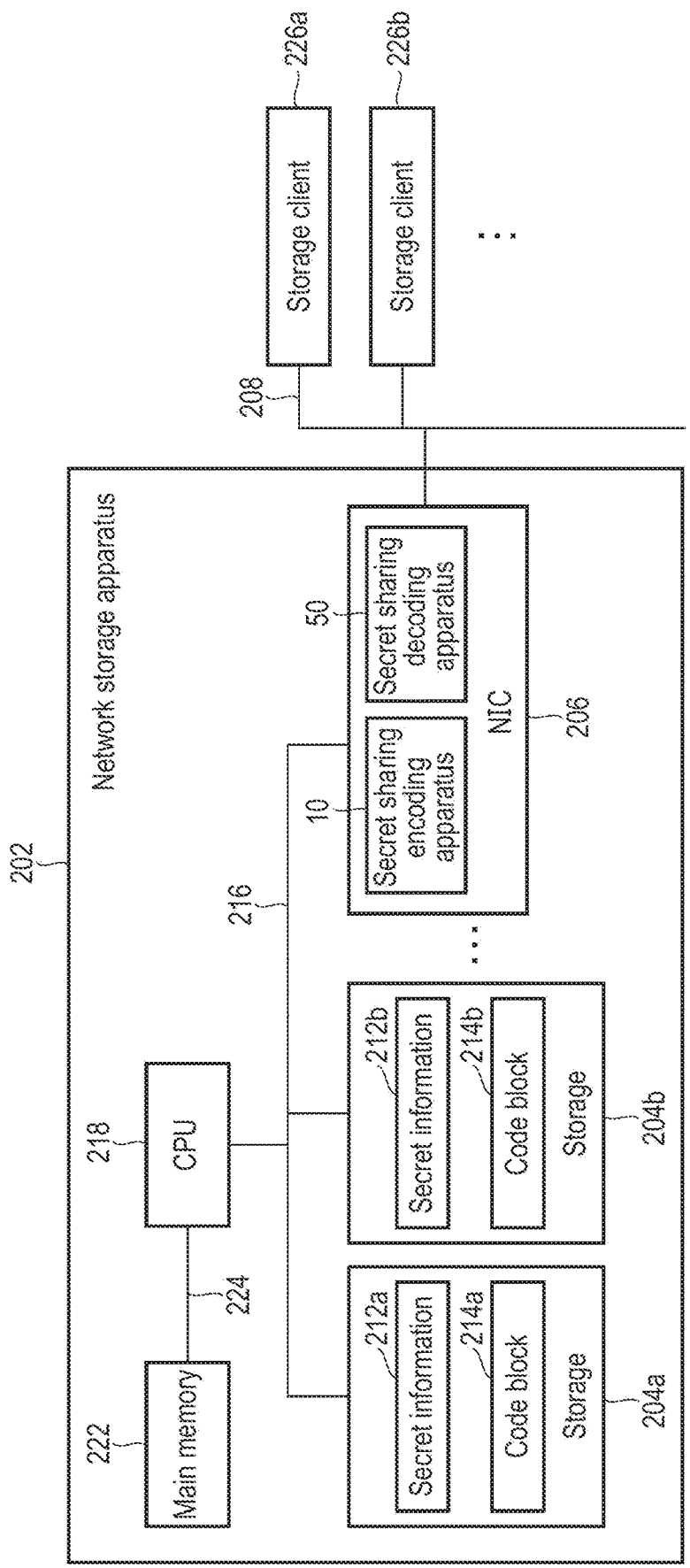
FIG. 7 is a diagram showing an example of a hardware configuration of a network storage apparatus to which the secret sharing encoding apparatus and the secret sharing decoding apparatus as information processing apparatuses according to the present embodiment are applied.

Next, a second embodiment will be described. FIG. 7 is a diagram showing an example of a hardware configuration of a network storage apparatus 202 to which the secret sharing encoding apparatus 10 and the secret sharing decoding apparatus 50 as information processing apparatuses according to the second embodiment are applied.

Storage clients 226a, 226b, and the like are connected to the network storage apparatus 202 via a network 208. Each of the storage clients 226a, 226b, and the like writes data to the network storage apparatus 202 or reads data from the network storage apparatus 202. The storage clients 226a, 226b, and the like include personal computers or the like. An example of the network 208 is a network using TCP/IP. However, any other network may be used as the network.

The network storage apparatus 202 includes storages 204a and 204b, a network interface controller (NIC) 206, a CPU 218, and a main memory 222.

The storages 204a and 204b and the NIC 206 are connected to the CPU 218 via a PCIe™ bus 216.

The main memory 222 is connected to the CPU 218 via a memory bus 224.

The storage 204a stores secret information 212a and a code block 214a. The storage 204b stores secret information 212b and a code block 214b. The secret information 212a and 212b correspond to the secret information 22 shown in FIG. 1 and the secret information 62 shown in FIG. 3. The code blocks 214a and 214b correspond to the code block shown in FIG. 1 and the code block shown in FIG. 3.

The secret sharing encoding apparatus 10 and the secret sharing decoding apparatus 50 are integrated in the NIC 206.

The secret sharing encoding apparatus 10 reads the secret information 212a from the storage 204a and encodes the secret information 212a to generate the code block 214a. The secret sharing encoding apparatus 10 writes the code block 214a to the storage 204a. The secret sharing decoding apparatus 50 reads the code block 214a from the storage 204a and decodes the secret information 212a from the code block 214a. The secret sharing decoding apparatus 50 writes the secret information 212a to the storage 204a.

Similarly, the secret sharing encoding apparatus 10 reads the secret information 212b from the storage 204b and encodes the secret information 212b to generate the code block 214b. The secret sharing encoding apparatus 10 writes the code block 214b to the storage 204b. The secret sharing decoding apparatus 50 reads the code block 214b from the storage 204b and decodes the secret information 212b from the code block 214b. The secret sharing decoding apparatus 50 writes the secret information 212b to the storage 204b.

In FIG. 7, the network storage apparatus 202 and the storage clients 226a and 226b are physically separated, and the network storage apparatus 202 has been described as a server set outside the storage clients 226a and 226b. However, as in the first embodiment, the network storage apparatus 202 and the storage clients 226a and 226b may be logically separated virtual computers or the like.

The storage clients 226a and 226b can be used by any of the owner and the user of the secret information S.

Instead of the secret sharing encoding apparatus 10 and the secret sharing decoding apparatus 50 being built in the NIC 206 as hardware, the main memory 122 may store the secret sharing encoding program and the secret sharing decoding program, and the function module corresponding to the secret sharing encoding apparatus 10 and the function module corresponding to the secret sharing decoding apparatus 50 may be achieved in software.

FIG. 8 is a diagram showing another example of a hardware configuration of a network storage apparatus 302 to which the secret sharing encoding apparatus 10 and the secret sharing decoding apparatus 50 as information processing apparatuses according to the second embodiment are applied.

Storage clients 326a, 326b, and the like are connected to the network storage apparatus 302 via a network 308. Each of the storage clients 326a, 326b, and the like writes data to the network storage apparatus 302 or reads data from the network storage apparatus 302. The storage clients 326a, 326b, and the like include personal computers or the like.

The network storage apparatus 302 includes storages 304a and 304b, a network interface controller (NIC) 306, a CPU 318, and a main memory 322.

The storages 304a and 304b and the NIC 306 are connected to the CPU 318 via a PCIe™ bus 316.

The main memory 322 is connected to the CPU 318 via a memory bus 324.

The storage 304a stores secret information 312a and a code block 314a. The storage 304b stores secret information 312b and a code block 314b. The secret information 312a and 312b correspond to the secret information 22 shown in FIG. 1 and the secret information 62 shown in FIG. 3. The code blocks 314a and 314b correspond to the code block shown in FIG. 1 and the code block shown in FIG. 3.

The secret sharing encoding apparatus 10a and the secret sharing decoding apparatus 50a are integrated in the storage client 326a. The secret sharing encoding apparatus 10b and the secret sharing decoding apparatus 50b are integrated in the storage client 326b.

The secret sharing encoding apparatus 10a reads the secret information 312a from the storage 304a and encodes the secret information 312a to generate the code block 314a. The secret sharing encoding apparatus 10a writes the code block 314a to the storage 304a. The secret sharing encoding apparatus 10a reads the secret information 312b from the storage 304b and encodes the secret information 312b to generate the code block 314b. The secret sharing encoding apparatus 10a writes the code block 314b to the storage 304b.

The secret sharing decoding apparatus 50a reads the code block 314a from the storage 304a and decodes the secret information 312a from the code block 314a. The secret sharing decoding apparatus 50a writes the secret information 312a to the storage 304a. The secret sharing decoding apparatus 50a reads the code block 314b from the storage 304b and decodes the code block 314b to the secret information 312b. The secret sharing decoding apparatus 50a writes the secret information 312b to the storage 304b.

Similarly, the secret sharing encoding apparatus 10b reads the secret information 312a from the storage 304a and encodes the secret information 312a to generate the code block 314a. The secret sharing encoding apparatus 10b writes the code block 314a to the storage 304a. The secret sharing encoding apparatus 10b reads the secret information 312b from the storage 304b and encodes the secret information 312b to generate the code block 314b. The secret sharing encoding apparatus 10b writes the code block 314b to the storage 304b.

The secret sharing decoding apparatus 50b reads the code block 314a from the storage 304a and decodes the secret information 312a from the code block 314a. The secret sharing decoding apparatus 50b writes the secret information 312a to the storage 304a. The secret sharing decoding apparatus 50b reads the code block 314b from the storage 304b and decodes the secret information 312b from the code block 314b. The secret sharing decoding apparatus 50b writes the secret information 312b to the storage 304b.

The storage clients 326a and 326b can be used by any of the owner and the user of the secret information S. If the storage clients 326a and 326b are used only by the owner of the secret information S, the storage clients 326a and 326b do not need to include the secret sharing decoding apparatuses 50a and 50b. If the storage clients 326a and 326b are used only by the user of the secret information S, the storage clients 326a and 326b do not need to include the secret sharing encoding apparatuses 10a and 10b.

It should be noted that in the second embodiment, any network may be used for the network in addition to the network using TCP/IP. In addition, the network storage apparatuses 202 and 302 are described as servers physically set outside. However, the network storage apparatuses 202 and 302 may be a logically separated computer (virtual computer, or the like) as in the first embodiment.

According to each embodiment, using the same MDS code for the secret sharing of an encryption key and the secret sharing of encrypted secret information makes it possible to provide hybrid secret sharing that can be decoded at a speed equal to or higher than that of the conventional hybrid-type secret sharing and is simple also in configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An information processing apparatus comprising:
a controller, wherein the controller is configured to:
calculate an encryption key and k key symbols from k random numbers;
encrypt k information symbols using the encryption key to output k encrypted symbols;

output any one of the k encrypted symbols and the k key symbols as k message symbols;
output a flag indicating which one of the k encrypted symbols and the k key symbols are the k message symbols;
encode the k message symbols with a maximum distance separable code to output n code symbols; and
output n code blocks from the n code symbols and the flag,
wherein k is a positive integer of one or more, and n is a positive integer larger than k.

2. The information processing apparatus according to claim 1, wherein the controller is configured to use Reed-Solomon code as the maximum distance separable code.

3. A storage system comprising;
a storage connected to the information processing apparatus according to claim 1,
wherein the storage is configured to store a large number of information symbols including the k information symbols, and
the information processing apparatus is configured to read the k information symbols from the storage and is configured to write the n code blocks to the storage.

4. The storage system according to claim 3, wherein the information processing apparatus is externally attached to the storage or incorporated in the storage.

5. A storage system comprising:
a first storage connected to the information processing apparatus according to claim 1; and
a second storage connected to the information processing apparatus according to claim 1,
wherein the first storage or the second storage is configured to store a large number of information symbols including the k information symbols,
the information processing apparatus is configured to read the k information symbols from the first storage or the second storage, and is configured to write the n code blocks to the first storage or the second storage, and
the information processing apparatus is externally attached to the first storage and the second storage in common.

6. A storage system comprising:
a storage;
a client configured to read data from the storage and configured to write data to the storage; and
an interface circuit configured to connect the storage to the client via a network,
wherein the client or the interface circuit includes the information processing apparatus according to claim 1,
the storage is configured to store a large number of information symbols including the k information symbols, and
the information processing apparatus is configured to read the k information symbols from the storage and is configured to write the n code blocks to the storage.

7. An information processing method comprising:
generating an encryption key and k key symbols from k random numbers;
encrypting k information symbols using the encryption key to output k encrypted symbols;
outputting any one of the k encrypted symbols and the k key symbols as k message symbols, and outputting a flag indicating which one of the k encrypted symbols and the k key symbols are the k message symbols;
encoding the k message symbols with a maximum distance separable code to output n code symbols; and
outputting n code blocks from the n code symbols and the flag,
wherein k is a positive integer of one or more, and n is a positive integer larger than k.

8. The information processing method according to claim 7, wherein the maximum distance separable code comprises Reed-Solomon code.

9. An information processing apparatus comprising:
a controller, wherein the controller is configured to:
receive at least k code blocks each including an indexed partial codeword obtained by encoding a key symbol or an encrypted symbol and a flag indicating whether the indexed partial codeword is obtained by encoding a key symbol or an encrypted symbol;
output the indexed partial codeword and the flag;
decode k message symbols from the indexed partial codeword with a maximum distance separable code;
output the k message symbols as k key symbols or as k encrypted symbols depending on a value of the flag;
calculate an encryption key from the output k key symbols; and
decrypt k information symbols from the output k encrypted symbols with the encryption key,
wherein k is a positive integer of one or more.

10. The information processing apparatus according to claim 9, wherein the controller is configured to use Reed-Solomon code as the maximum distance separable code.

11. A storage system comprising;
a storage connected to the information processing apparatus according to claim 9,
wherein the storage is configured to store at least k code blocks, and
the information processing apparatus is configured to read the at least k code blocks from the storage and is configured to write the k information symbols to the storage.

12. The storage system according to claim 11, wherein the information processing apparatus is externally attached to the storage or incorporated in the storage.

13. A storage system comprising:
a first storage connected to the information processing apparatus according to claim 9; and
a second storage connected to the information processing apparatus according to claim 9,
wherein the first storage or the second storage is configured to store the at least k code blocks,
the information processing apparatus is configured to read the at least k code blocks from the first storage or the second storage, and is configured to write the k information symbols to the first storage or the second storage, and
the information processing apparatus is externally attached to the first storage and the second storage in common.

14. A storage system comprising:
a storage;
a client configured to read data from the storage and configured to write data to the storage; and
an interface circuit configured to connect the storage to the client via a network,
wherein the client or the interface circuit includes the information processing apparatus according to claim 9,
the storage is configured to store the at least k code blocks, and the information processing apparatus is configured to read the at least k code blocks from the storage and is configured to write the k information symbols to the storage.

15. An information processing method comprising:
receiving at least k code blocks each including an indexed partial codeword obtained by encoding a key symbol or an encrypted symbol and a flag indicating whether the indexed partial codeword is obtained by encoding a key symbol or an encrypted symbol, and to output the indexed partial codeword and the flag;
decoding k message symbols from the indexed partial codeword with a maximum distance separable code;
outputting the k message symbols as k key symbols or as k encrypted symbols depending on a value of the flag;
calculating an encryption key from the k key symbols output; and
decrypting k information symbols from the k encrypted symbols output with the encryption key,
wherein k is a positive integer of one or more.

16. The information processing method according to claim 15, wherein the maximum distance separable code comprises Reed-Solomon code.

17. The information processing method according to claim 7, wherein
a storage is connected to an information processing apparatus executing the information processing method according to claim 7;
the storage is configured to store a large number of information symbols including the k information symbols; and
the information processing method further comprises:
reading the k information symbols from the storage; and
writing the n code blocks to the storage.

18. The information processing method according to claim 7, wherein
a first storage is connected to an information processing apparatus executing the information processing method according to claim 7;
a second storage is connected to the information processing apparatus;
the information processing apparatus is externally attached to the first storage and the second storage in common;
the first storage or the second storage is configured to store a large number of information symbols including the k information symbols; and
the information processing method comprises:
reading the k information symbols from the first storage or the second storage; and
writing the n code blocks to the first storage or the second storage.

19. The information processing method according to claim 15, wherein a storage is connected to an information processing apparatus executing the information processing method according to claim 15;
the storage is configured to store at least k code blocks; and
the information processing method further comprises:
reading the at least k code blocks from the storage; and
writing the k information symbols to the storage.

20. The information processing method according to claim 15, wherein
a first storage is connected to an information processing apparatus executing the information processing method according to claim 15;
a second storage is connected to the information processing apparatus;
the first storage or the second storage is configured to store the at least k code blocks;
the information processing apparatus is externally attached to the first storage and the second storage in common; and
the information processing method comprises:
reading the at least k code blocks from the first storage or the second storage; and
writing the k information symbols to the first storage or the second storage.

* * * * *